UNITED STATES PATENT OFFICE.

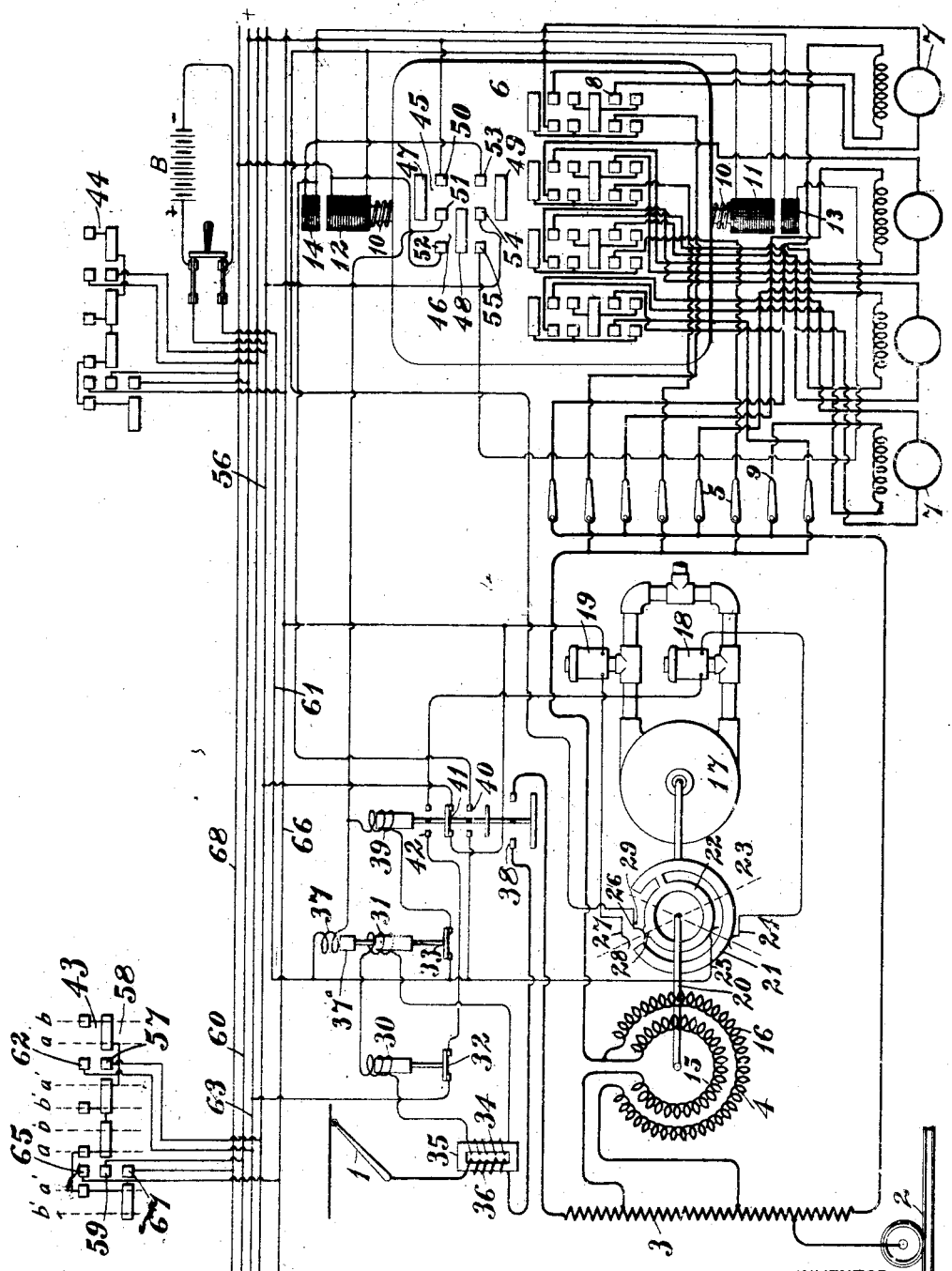

LOUIS M. ASPINWALL, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

No. 869,824.   Specification of Letters Patent.   Patented Oct. 29, 1907.

Application filed January 3, 1905. Serial No. 239,519.

*To all whom it may concern:*

Be it known that I, LOUIS M. ASPINWALL, a citizen of the United States, and a resident of Wilkinsburg, in the county of Allegheny and State of Pennsylvania, have invented a new and useful Improvement in Control Systems, of which the following is a specification.

My invention relates to controlling systems for electrical translating devices, and particularly to such systems as are employed in the control of electric railway vehicles.

My invention has for its object to provide means for preventing the formation of such circuit connections for the propelling motors of an electric vehicle that the motors may act as generators and deliver current to the controlling devices and circuits.

Another object of the invention is to provide means for preventing the production of arcs or injurious sparking between the terminals of the reversing switches that may be employed in such systems.

Reversing switches, as usually constructed, are provided with only two normal positions, corresponding, respectively, to forward and reverse direction of rotation of the motors. If a vehicle that is equipped with a reversing switch of this type is operated by other means than its driving motors, when the reversing switch occupies a position corresponding to a direction of motion that is opposite to the actual direction, the motors will act as generators and deliver current to the controlling devices. This may be prevented by the employment of a reversing switch which returns, after having occupied either its forward or reverse position, to a position such that no circuit may be completed through it, a reversing switch of this character being provided by my invention. With such a reversing switch, a circuit-breaker should be employed which interrupts the main circuit whenever the translating devices are not in use, and my invention provides means for preventing the reversing switch from returning from either its forward or its reverse position to its "off" position until after the circuit-breaker has opened.

The single figure of the accompanying drawing illustrates a power system embodying my invention.

Single-phase, alternating current energy is supplied from a trolley 1 and a track rail 2 through an auto-transformer winding 3, a voltage regulator 4, cut-out switches 5, a reversing switch 6 and motors 7, the terminals of the armature and field magnet windings of which are properly connected to stationary contact terminals 8 of the reversing switch 6 and to contact terminals 9 of the cut-out switches 5.

The reversing switch 6 is normally maintained in its "off" position by means of springs 10 and is thrown to either its forward or its reverse position by means of operating magnet windings 11 and 12, in which position it is held by the one or the other of two retaining magnet windings 13 and 14.

The voltage regulator 4 comprises a primary winding 15 and a secondary winding 16 which are inductively related and are relatively adjustable. This regulator may conform substantially to what is set forth in Patent No. 740,147, granted September 29, 1903, to the Westinghouse Electric & Manufacturing Company upon an application filed by Benjamin G. Lamme, or it may have such other specific form as may be desired. A motor of any suitable construction may be provided for the purpose of rotating the primary winding 15. I have shown an air motor 17 for this service, the supply of air for rotating the winding 15 in a direction corresponding to increasing voltages being governed by a valve having a controlling magnet 18, and the air supply for rotating the motor 17 and winding 15 in a direction corresponding to decreasing voltages being governed by a valve having a controlling magnet 19. Evidently the air motor 17 may be replaced by a motor operated by any other character of energy without affecting the scope of my invention.

Mounted upon the shaft 20 of the voltage regulator 4, or operated otherwise by the rotation of the winding 15, is an interlocking switch 21 comprising a ring 22 and a ring segment 23 that are electrically connected and brushes 24, 25, 26 and 27 adapted to engage therewith. The brush 26 may engage only the projection 28 on the ring 22 when the regulator is in its "off" position, being prevented from engagement with other portions of the ring by means of a stop 29. Operating magnet windings 30 and 31 of a limit switch 32 and a relay switch 33, respectively, are supplied with energy from a secondary winding 34 of a series transformer 35, the primary winding 36 of which is connected in series with the auto-transformer winding 3. The relay switch 33 is provided with a retaining magnet winding 37, an armature core 37ª being brought within its magnetic influence when the relay switch is opened by the coil 31. A circuit-breaker 38 is provided with an operating magnet winding 39 in circuit with the relay switch 33, and interlocking switches 40, 41 and 42 are provided, the movable members of which are so connected to the movable member of the circuit-breaker 38 as to be operated by and with it. The operating magnet windings of the various devices in the main motor circuits are supplied with energy from a battery B and the circuits are controlled by means of master switches 43 and 44.

Interlocking switches 45 and 46 are mounted upon or are otherwise operated by the reversing switch 6, the former being for the purpose of closing the circuit to the circuit-breaker operating winding 39 and the latter for the purpose of closing the circuits to the retaining magnet windings 13 and 14 after the reversing switch is thrown to either its forward or reverse position. These interlocking switches comprise movable conducting strips 47, 48 and 49 which are adapted to engage stationary contact fingers 50, 51, 52, 53, 54 and 55, the conducting strip 48 being common to both interlocking switches for the sake of simplicity of construction.

If the master switch 43 is moved to position $a$, a circuit is completed from the positive terminal of the battery B, through conductor 56, contact finger 57, controller drum 58, contact finger 59, conductor 60, reversing switch operating magnet 11, contact finger 26, projection 28, ring 22, contact finger 25 and conductor 61, to the negative terminal of the battery B.

The magnet winding 11, when energized, throws the reversing switch 6 to its forward position and at the same time operates interlocking switches 45 and 46. A battery circuit is then completed through the master switch 43, conductor 60, contact finger 50, conducting strip 47, contact finger 51, operating magnet winding 39 of the circuit-breaker 38, relay switch 33 and conductor 61.

The circuit-breaker 38 is then closed and a battery circuit is completed through the conductor 56, contact finger 54, conducting strip 48, contact finger 55, retaining magnet winding 13, interlocking switch 40 and conductor 61. The motors 7 are now supplied with energy at the lowest voltage from the auto-transformer winding 3.

If the master switch 43 is moved to the position $b$, a battery circuit is established through conductor 56, contact finger 57, drum 58, contact finger 62, conductor 63, limit switch 32, interlocking switch 42, valve operating magnet winding 18, finger 24, rings 23 and 22, finger 25 and conductor 61. A supply of air is then admitted to the motor 17 and the primary winding 15 of the voltage regulator 4 and the interlocking switch rings 22 and 23 are rotated so that contact finger 27 engages the ring 23 and contact finger 26 disengages the projection 28. After the latter operation has occurred, the circuit of the operating magnet winding 11 is interrupted and the retaining magnet winding 13 serves to hold the reversing switch 6 in its forward position.

Rotation of the primary winding 15 continues through an angle of 180° when the contact finger 24 becomes disengaged from the ring 23, thereby interrupting the circuit of the valve-operating magnet winding 18 and causing the supply of air to the motor 17 to be shut off. The motors 7 are now supplied with energy of the highest voltage.

If the current delivered to the motors at any time exceeds a predetermined limiting value, sufficient energy will be supplied from the secondary winding 34 of the series transformer 35 to the operating magnet winding 30 of the limit switch 32 to open said switch. The circuit of the valve-operating magnet winding 18 will be thus interrupted and further rotation of the primary winding 15 will be prevented until the current supplied to the auto-transformer winding 3 has fallen below the predetermined limiting value.

If a still larger amount of energy is supplied to the auto-transformer winding 3 and this amount of energy exceeds a predetermined limiting value, sufficient energy will be supplied to the magnet winding 31 to operate the relay switch 33 and the circuit of the operating magnet winding 39 of the circuit-breaker 38 will be thereby interrupted. By reason of such circuit interruption, the interlocking switch 40 will open 
and the circuit of the retaining magnet winding 13 of the reversing switch 6 will be thereby interrupted, whereby the said switch 6 will be permitted to return to its "off" position. When the relay switch 33 is fully opened, the armature core $37^a$ is brought into the field of the retaining magnet winding 37 and the relay switch 33 is held in its open position until the reversing switch 6 and the master switch 43 are returned to their "off" positions.

When the circuit-breaker 38 is open, a circuit is established, by means of switch 41, through the valve-operating magnet winding 19, contact finger 27, drum rings 23 and 22, contact finger 25 and conductor 61. Air pressure is then admitted to the motor 17 and the primary winding 15 is returned to a position corresponding to minimum voltage, in which position the contact finger 27 no longer engages the drum ring 23 and the circuit of the valve-operating magnet winding 19 is interrupted, thereby preventing further rotation of the primary member of the regulator.

If, during normal operation of the motors, it is desired to decrease the voltage applied to them, the master switch 43 should be returned to position $a$, thereby completing a battery circuit through the drum 58, contact finger 65, conductor 66, operating magnet winding of the valve 19, contact finger 27, drum rings 23 and 22, contact finger 25 and conductor 61.

If the master switch 43 is moved to the position $a'$, finger 67 engages the drum 58 and a battery circuit is established through conductor 68 and operating magnet winding 12 of the reversing switch 6, thereby causing the direction of rotation of the armatures of the motors 7 to be reversed.

If the system is employed for the control of a plurality of railway vehicles, each of which is provided with the devices here shown and described, the conductors 56, 60, 63, 66 and 68 may be extended from car to car, thus enabling the train to be controlled from a single master switch located on any car.

The main circuits of the system; i. e., those containing devices bearing reference characters 1, 36, 3, 4, 15, 16, 5, 6 and 7, are shown in the drawings by heavy lines in order to distinguish them from the auxiliary or control circuits that contain the remaining devices.

I claim as my invention:

1. In a system of control, the combination with main and auxiliary circuits a translating device, a reversing switch provided with means for moving it to and holding it in an "off" position, and a circuit-breaker located in the main circuit, of means for preventing the reversing switch from returning to its "off" position until the circuit-breaker has opened.

2. In a system of control, the combination with main and auxiliary circuits a translating device, a reversing switch provided with means for moving it to and holding it in an "off" position, and a circuit-breaker located in the main circuit, of means controlled by the circuit-breaker for preventing the reversing switch from returning to its "off" position until the circuit-breaker has opened.

3. In a system of control, the combination with a translating device, a reversing switch and a circuit-breaker, of operating and retaining magnet windings for said reversing switch, and an interlocking switch operated by the reversing switch which controls the circuits to the retaining magnet windings.

4. In a system of control, the combination with a translating device, a reversing switch, and a circuit-breaker, of operating and retaining magnet windings for said reversing switch, and an interlocking switch operated by the circuit-breaker which controls the circuits to the retaining magnet windings.

5. In a system of control, the combination with a translating device, a reversing switch, and a circuit-breaker, of operating and retaining magnet windings for said reversing switch, an interlocking switch operated by the reversing switch for preventing energization of the retaining magnet winding until the reversing switch has been thrown to its forward or to its reverse position, and an interlocking switch operated by the reversing switch for preventing deënergization of the retaining magnet windings until the circuit-breaker has opened.

6. The combination with a translating device and a circuit-breaker located in the circuit thereof, of a reversing switch, means for retaining the reversing switch in normal open-circuit position, means for moving the reversing switch to either its forward or its reverse operating position, and means for holding it in said operating position that is governed by the circuit-breaker.

7. The combination with a translating device and a circuit-breaker located in the circuit thereof, of a reversing switch, means for retaining the reversing switch in normal open-circuit position, means for moving the reversing switch to either its forward or its reverse position, and means for retaining the reversing switch in said position until the circuit-breaker is opened.

8. The combination with a translating device and a circuit-breaker located in the circuit thereof, of a reversing switch, means for retaining the reversing switch in normal open-circuit position, means for moving the reversing switch to either its forward or its reverse position, and means for retaining the reversing switch in said position while the circuit-breaker is closed.

In testimony whereof, I have hereunto subscribed my name this 30th day of December, 1904.

LOUIS M. ASPINWALL.

Witnesses:
O. SEF. SANDBORGH,
BIRNEY HINES.